United States Patent [19]

Schwarz

[11] 3,864,741

[45] Feb. 4, 1975

[54] SERVO CHANNEL EQUALIZATION NETWORK

[75] Inventor: Theodore A. Schwarz, Saratoga, Calif.

[73] Assignee: International Business Machines Corporation, Armonk, N.Y.

[22] Filed: June 28, 1973

[21] Appl. No.: 374,294

[52] U.S. Cl. .......... 360/77

[51] Int. Cl. .......... G11b 21/10

[58] Field of Search .......... 360/77, 27, 67

[56] References Cited

UNITED STATES PATENTS 3,597,750 8/1971 Brunner et al. .......... 340/174.1 C 3,691,543 9/1972 Mueller .......... 340/174.1 C

*Primary Examiner*—Vincent P. Canney

*Attorney, Agent, or Firm*—Charles E. Rohrer

[57] ABSTRACT

In a magnetic disk recording device, a special sector is recorded in the servo tracks at least once per revolution to provide a 100 percent off-track signal to move the heads toward the spindle and a 100 percent off-track signal to move the heads away from the spindle. These signals are compared and an automatic gain control circuit provided to equalize the signals. During the equalization period, the error signal output to the head actuator is suspended so that the heads are not actually moved.

5 Claims, 9 Drawing Figures

SERVO CHANNEL EQUALIZATION NETWORK

This invention relates to a path following servo mechanism and more particularly to special means in the servo system to compensate for errors introduced into path following accuracy by conditions in the mechanism itself.

RELATED PATENTS

Several patents have been issued to the assignee of the present invention which provide background information. They are:

U.S. Pat. No. 3,219,353 to Prentky;
U.S. Pat. No. 3,404,392 to Sordello;
U.S. Pat. No. 3,427,606 to Black and Sordello;
U.S. Pat. No. 3,534,344 to Santana;
U.S. Pat. No. 3,614,756 to McIntosh and Padalino; and
U.S. Pat. No. 3,691,543 to Mueller.

BACKGROUND OF THE INVENTION

Many data processing computer systems make use of auxiliary storage devices to augment the amount of memory storage available in the computer's main memory. Data stored in auxiliary storage is read into main memory when needed, operated upon by the computer and written onto the auxiliary storage device when finished.

The most common type of auxiliary storage device is the magnetic recorder which includes the magnetic disk device where data is stored on continuous concentric tracks located on disk surfaces. An example of such a device in current use is the IBM 3330 Direct Access Disk Device which utilizes a disk pack comprising ten disks, 20 disk surfaces with 411 continuous concentric tracks on each disk surface. The mechanisms and the circuits which are used in this device can be viewed in the document IBM Maintenance Library, ID 3330301.

Data head located on a particular track on a disk surface is read by properly positioning a transducer (read/write head) directly over the track. In order to maintain the haed in proper position over the data track, track following servo systems are incorporated into disk devices. These systems receive their positioning information from special servo signals built into the disk along the data track with which registration is to be maintained. The systems normally have used two types of servo data, one signal produced from one side of the data track with a second signal produced from the other side; these signals being combined and/or compared in appropriate circuits to determine any error that might be present in the registration of head to track center line. The types of servo signals variously used have included flux transitions such as described in the patents to Santana and Mueller, phase discrimination described in the patent to Black and Sordello, and dual frequency systems such as described in the patent to Sordello.

Servo signals have been arranged in continuous fashion throughout the extent of a continuous servo track and they have been arranged on intervals along a track. The servo signals have been interspersed with data on the data track itself and they have been placed in dual layer disks directly beneath the data track.

Whatever the type of servo system used and whatever the configuration of the servo signals on the disk, the problem has remained that over a period of time, the servo mechanism may find an error in head-to-track registration when none actually exists due to additive tolerance differentials in the electronic components which process the servo signals, due to temperature drift in the electronic components, in aging of the components, and any such condition causing a difference in the handling of one signal from the handling of the other signal. It is the general object of this invention to provide an equalizing network such that these errors are substantially eliminated.

SUMMARY OF THE INVENTION

This invention involves the incorporation of special equalizing data in the magnetic recording medium along the tracks at periodic intervals such that a track following servo system senses conditions of 100 percent error to move the head toward the spindle and senses conditions of 100 percent error to move the head away from the spindle and should they be different, means are provided to equalize the signals and eliminate the difference.

BRIEF DESCRIPTION OF THE DRAWINGS

The foregoing and other objects, features and advantages of the invention will be apparent from the following detailed description of a preferred embodiment of the invention as illustrated in the accompanying drawings wherein.

BRIEF DESCRIPTION OF THE EMBODIMENT

The invention can be incorporated into any of the servo systems mentioned previously; that is, plural frequency, phase discriminating or magnetic flux transitions. While the type of system used does not distinguish a preferred embodiment of the invention, to illustrate the invention the particular embodiment described herein is in relation to a dual frequency system.

Figures 1, 2:
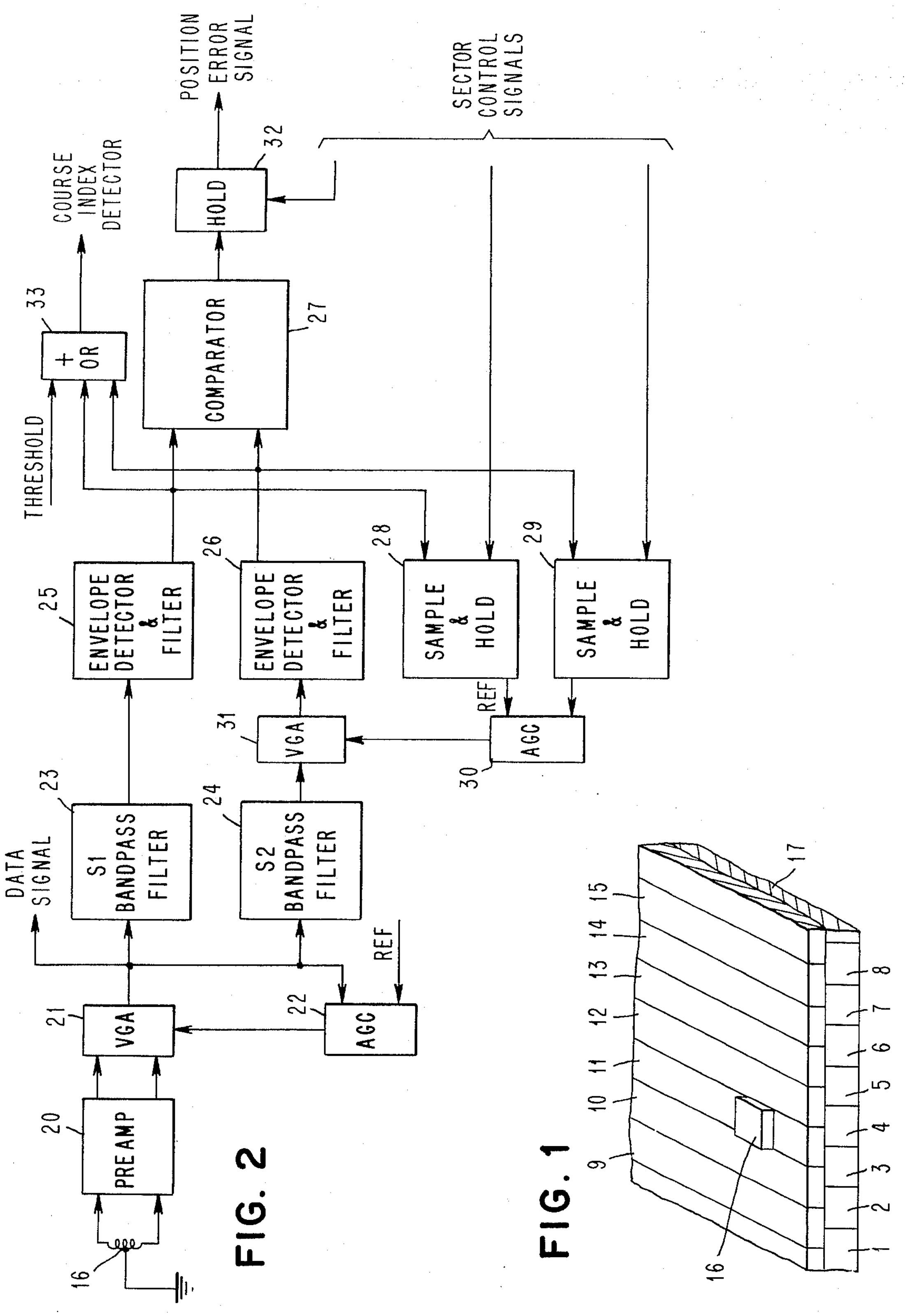
FIG. 1 is a perspective drawing of a portion of a dual layer magnetic disk in cross-section.
FIG. 2 shows an embodiment of the track following circuit of this invention.

FIG. 1 shows a segment of a magnetic disk 17 the surface of which includes data tracks 9 through 15 and in a lower layer servo tracks 1 through 8. A transducing head to pick up both the data and the servo signals is shown at 16 positioned directly over data track 11 and midway over servo tracks 3 and 4. In such a scheme, the head 16 can be maintained in a position of exact registration with data track 11 by balancing the signals received from servo tracks 3 and 4. It should be understood that the disk shown in FIG. 1 is to set the environment of the invention and does not limit the invention. For example, the servo tracks could be located on an entirely separate disk and read by an entirely separate transducing head or the servo track could be located on a different portion of the same disk. The essential requirement is that the data head is to be maintained in registration with the data track by virtue of two servo signals that are balanced in associated circuitry now to be described.

In FIG. 2, head 16 which picks up the data signals and the two servo signals is shown in electrical symbols.

Signals from the head 16 enter a preamplifier 20 which might, for example, amplify the signals from millivolt values to between 5 and 10 volts. A variable gain amplifier 21 with an automatic gain control circuit 22 provide means for keeping the envelope common to all signals constant for input to the bandpass circuits 23 and 24. The signals are sent through filters to separate the data signal out and to separate the first servo signal from the second servo signal. Filter 23 passes only the servo signal S1 and filter 24 passes only the servo signal S2. Peak detectors at 25 and 26 convert the maximum amplitude of the S1 and S2 signals to corresponding DC values which are then compared in comparator 27 in order to provide a DC position error signal. That signal is amplified and sent to an actuator to move the servo head in one direction or another depending on the polarity and magnitude of the position error signal.

Had a phase discriminating network been provided, the circuit would remain the same except that the bandpass filters would be replaced with phase discriminating networks so that, for example, a servo signal S1 which is out of phase with a servo signal S2 could be separated and separately analyzed for comparison.

Had a magnetic transition flux circuit been chosen for illustration, bandpass filters would have been replaced with gates as shown in U.S. Pat. No. 3,691,543 to Mueller, mentioned above. The circuit would remain substantially the same with the S1 signal being separated from the S2 signal, peak detected, compared and sent to an actuator for moving the head in response to an error signal.

It is apparent from an inspection of FIG. 2 that many different electronic components are involved in the processing of the servo signals derived from head 16. Additive tolerance errors or errors resulting as a function of temperature drift in the components, especially in the bandpass filters and in the peak detectors may produce the presence of an error signal output where none may be needed to maintain head/track registration. Consequently, in balancing the servo signals the head may be moved out of exact track registration. In order to remedy that condition, variable gain amplifier 31 has been inserted into the S2 network so that if the S2 signal, when sensed at a 100 percent off track value, is different from the S1 signal, when sensed at a 100 percent off track value, the variable gain amplifier (VGA) 31 can either increase or decrease the S2 signal to bring it into exact correspondence with the S1 signal. Amplifier 31 is controlled by an automatic gain control (AGC) circuit 30 which receives as its reference value a signal from sample and hold circuit 28 which corresponds to a 100 percent off track S1 signal. AGC circuit 30 receives as its slave value from sample and hold circuit 29 a signal which corresponds to a 100 percent off track S2 value. The two 100 percent off track signals are compared and if different, the S2 signal is reduced or increased in magnitude by VGA 31 to bring the values into correct adjustment.

Figure 3:
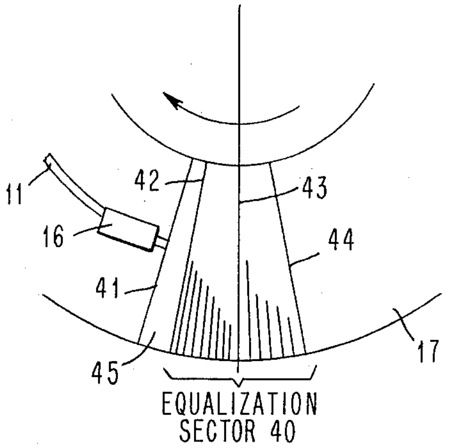
FIG. 3 shows the equalization sector recorded on the disk.

FIG. 3 shows the means through which 100 percent off track values are obtained for driving the equalization network just discussed with reference to FIG. 2. In FIG. 3, transducing head 16 is shown positioned to read the data on data track 11 which is situated on the surface of disk 17. While, for the sake of clarity, data track 11 is shown stopping at radial 41 it may actually continue over the equalization sector 40 in a dual layer disk such as shown in FIG. 1. Regardless of whether the data track is terminated at radial 41, in the embodiment shown the servo tracks are terminated at radial 41; the gap 45 between radials 41 and 42 together with the equalization sector 40 between radials 42 and 44 are interspersed with the servo tracks, at least one sector per disk revolution.

Gap 45 may or may not be provided but if it is, it serves as an indexing mechanism to alert the system that an equalization sector is approaching and to otherwise provide information for stating the position of the track relative to the head in an angular sense so that the rotational position of the disk can be ascertained by the system.

When the first half of the equalization sector 40 rotates under the head 16, the recorded information from the equalization sector provides only an S1 signal. This is easily obtained in a dual frequency system by recording the S1 signal in such a manner that the transition (+to−to+) lie along the same radial in both of the adjacent servo tracks which are supplying signals through head 16. With reference to FIG. 1, in the first half of the equalization sector the frequency S1 is recorded in both servo tracks 3 and 4 (and all servo tracks). In the second half of the equalization sector, only the servo signal S2 is recorded with transitions along the same radials in servo tracks 3 and 4 (and all other servo tracks) so that the head picks up only an S2 signal. In that manner, a signal corresponding to a 100 percent off track condition is noted on the S1 side in the first half of the equalization sector and on the S2 side in the second half of the equalization sector. With reference to FIG. 1, the signal picked up in the first half of the equalization sector is the same as if the head 16 has drifted off the center line of data track 11 to a position where it is directly over servo track 3. Similarly, during the second half of the equalization sector, the signal appears as though head 16 has drifted off the center line of data track 11 until it is positioned directly over servo track 4.

Returning again to FIG. 2, note that a hold circuit 32 has been placed on the output of the comparator so that during the period of time when the head is passing over the equalization sector the output of the comparator is disabled to prevent the 100 percent off track signals detected in the passage over the equalization sector from themselves throwing the head into a wandering pattern. Note also the circuit 33 which has been provided to cooperate with the gap 45. Circuit 33 passes a signal only when both S1 and S2 signals are absent as, for example, they are in gap 45. Thus, a clocking or indexing signal is derived from the gap 45 for rotational position calculations and also, for example, to alert hold circuit 32 and sample and hold circuit 28 and 29 to the prospect of an approaching equalization sector.

The width of the first half of the equalization sector must be sufficient to allow voltage build-up to a steady state value representing 100 percent off track condition and, of course, the second half of the equalization sector must also be at least of that same sufficient width and may be wider, if desired, to accommodate the AGC correction period.

Figures 4A, 4B, 4C, 4D, 4E, 4F:
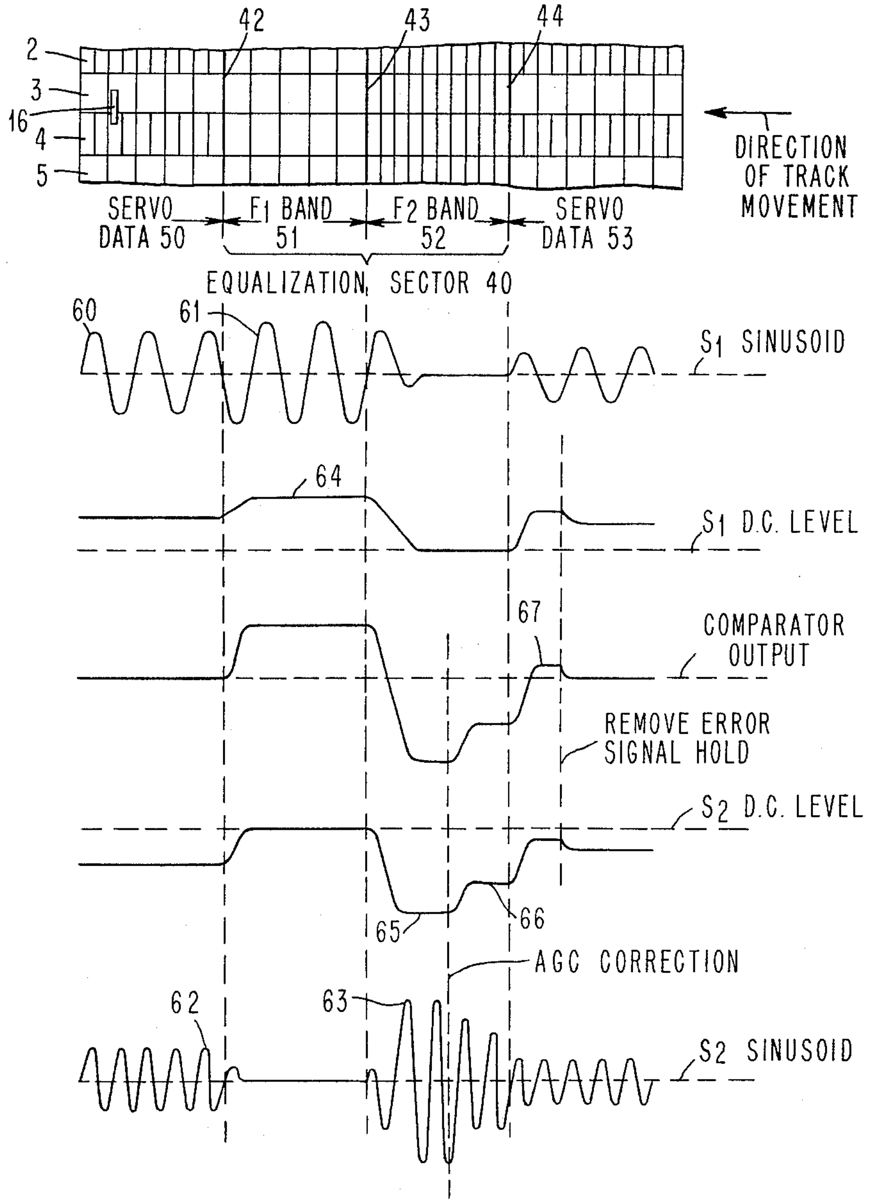
FIG. 4, comprised of FIGS. 4A through 4F, graphically shows voltage patterns obtained through use of this invention.

FIG. 4 shows a chart of various signals during the passage of the head over the equalization sector. On FIG. 4A, servo head 16 is shown positioned slightly off center such that it is a little more on servo track 3 than it is on servo track 4. The transitional lines (+to−to+)

shown on tracks 3 and 4 depict that servo track 3 is recorded at one-half the frequency of servo track 4. Actually the two signals can be of any different values which are sufficiently separate to operate the system well and would probably not be integrally related. For clarity of explanation, however, the direction of movement of the tracks under the head carries the servo head 16 from the area of servo data 50 into the equalization sector, the first half of which is termed an F1 band 51, and the second half of which is termed an F2 band 52. Eventually the disk rotation carries the head out of the equalization sector into the area of servo data 53. The gap 45 shown in FIG. 3 is not shown illustrated in FIG. 4. Note that during F1 band 51, the frequency on servo track 3 is also recorded on servo track 4 as signified by the transition lines occurring at half the normal frequency rate on track 4. Note also that during F2 band 52, the second half of the equalization sector 50, the frequency recorded on servo track 4 is also recorded on servo track 3 as signified by the doubled number of transitional lines on track 3.

FIG. 4B shows the S1 sinusoid recorded on track 3 illustrating it to be of an amplitude 60. When the F1 band 51 is entered, note that the signal jumps in value to less than twice the level at 60 as shown at 61. This is due, of course, to the fact that the S1 signal is now picked up from two servo tracks. A slight time delay is shown in arriving at the final steady state value 61. During the second half of the equalization sector, F2 band 52, the S1 sinusoid drops to zero.

FIG. 4F shows a graph of the S2 sinusoid signal which is recorded on servo track 4. Note that it drops to zero during the first half of the equalization sector and jumps to an amplitude 63 greater than twice its normal value 62 during the first part of the second half of the equalization sector. Amplitude 60 would obviously be detected as greater than amplitude 62 at the head 16 due to is offset condition; however, due to some difference in the handling of the two signals in their separate filtering circuits, amplitudes 60 and 62, representing the output of the filtering circuits, are equal. Thus, the graphical depiction in FIG. 4 is for a component error in either filter 23 or filter 24, or both. FIG. 4C shows the peak detected value for the S1 signal and FIG. 4E shows the peak detected value for the S2 signal. FIG. 4D is the comparator output and illustrates during servo data period 50, that the comparator output is zero even though the servo head 16 is not on track; that is, no error signal is being produced, the S1 signal and the S2 signal are in balance, even though the head is off center. This means that even though the detected signal S1 is larger than the detected signal S2, the comparator shows a zero output. Thus during the handling of the equalization signals, the peak detected value 64 of the 100 percent S1 signal is detected as slightly lower than the peak detected value 65 of the S2 signal. The automatic gain control circuit then provides a correction by decreasing the level of the 100 percent S2 signal to an amplitude 66 in order to bring it into exact correspondence with the amplitude of the 100 percent S1 signal. When the head passes into the area of servo data 53 and back into normal servo operation, the output of the comparator 67 is allowed to pass to the actuator after it reaches a steady state value. As shown on FIG. 4D, that steady state value 67 will be an error signal roughly corresponding to the amount of AGC correction. The error signal causes the servo head to move into exact registration with the data track at which point the error signal is eliminated since, when the head moves, the detected signal S1 decreases in value as shown on FIG. 4C and moves to exactly the value which the S2 signal takes on FIG. 4E. Thus, the output of the comparator on FIG. 4D drops to zero as soon as the head moves into correct position.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a system for following a target path, said system deriving a first path following signal from a first servo path on one side of said target path and a second path following signal from a second servo path on the other side of said target path, means for generating 100 percent off-track conditions comprising a first portion which contains said first signal on both said servo paths, said portion located on said servo paths so that said first signal is derived from each of said servo paths during a first common time period to generate a 100 percent off-track condition, a second portion which contains said second signal on said servo paths, said second portion located on said servo paths so that said second signal is derived from each of said servo paths during a second common time period to generate a second and different 100 percent off-track condition.

2. The system of claim 1 further including means for comparing said two 100 percent off-track signals and means for adjusting said 100 percent off-track signals to balance one another.

3. In a magnetic recording disk device containing concentric tracks of recorded information on the surface of the disks and transducing heads to read and write said information, a servo system for maintaining the track following accuracy of a transducing head wherein a special sector of recorded information is placed in at least some of said tracks on said disks, said special sector comprising two portions wherein a first portion contains a first servo signal on adjacent tracks, said first portion beginning at a first radial on each said adjacent track and ending on a second radial on each said adjacent track, a second portion which contains a second servo signal on said adjacent tracks, said second servo signal different from said first servo signal, said second portion beginning at a third radial on each said adjacent track and ending on a fourth radial on each said adjacent track, so that said servo system can be tested for 100 percent off-track conditions and said conditions can be equalized to compensate for errors extraneous to proper operation.

4. The system of claim 3 further including means for comparing said two 100 percent off-track signals and means for adjusting said 100 percent off-track signals to balance one another.

5. In a system for following a target path, means for producing a first signal to move toward said path from a first direction, means for producing a second signal to move toward said path from a second direction, comparator means for comparing the first and second signals to produce a position error signal if said two compared signals are not in balance, means for suspending the operation of said comparator means and generating a 100 percent off-track first signal and a 100 percent off-track second signal, means for comparing said 100 percent off-track signals, and means for adjusting one of said 100 percent off-track signals to bring them in balance.

* * * * *